United States Patent [19]

Ohtake et al.

[11] Patent Number: 5,384,658
[45] Date of Patent: Jan. 24, 1995

[54] PLASTIC OPTICAL MEMBER AND LIGHT-QUANTITY-CONTROLLING MEMBER EACH HAVING A LIGHT-DIFFUSING LAYER ON ITS SURFACE

[75] Inventors: Genji Ohtake, Yokohama; Hisao Morohashi, Kawasaki; Souichi Hasegawa, Yokohama, all of Japan

[73] Assignee: Ohno Research & Development Laboratories Co. Ltd., Yokohama, Japan

[21] Appl. No.: 849,398

[22] PCT Filed: Sep. 3, 1991

[86] PCT No.: PCT/JP91/01177

§ 371 Date: Apr. 27, 1992

§ 102(e) Date: Apr. 27, 1992

[87] PCT Pub. No.: WO92/04400

PCT Pub. Date: Mar. 19, 1992

[30] Foreign Application Priority Data

Sep. 4, 1990 [JP] Japan ................... 2-233978
Oct. 30, 1990 [JP] Japan ................... 2-292991

[51] Int. Cl.[6] .................. G02B 13/20; G02B 5/02; A61G 13/00
[52] U.S. Cl. .................. 359/707; 359/599; 362/33
[58] Field of Search ............... 359/599, 707, 893, 894, 359/619; 362/26, 31, 33

[56] References Cited

U.S. PATENT DOCUMENTS

| | | | |
|---|---|---|---|
| 3,671,101 | 6/1972 | Finch | 359/599 |
| 3,850,667 | 11/1974 | Tani et al. | 117/36.7 |
| 4,114,983 | 9/1978 | Maffitt et al. | 359/599 |
| 4,310,219 | 1/1982 | Jaccard | 359/599 |
| 4,427,265 | 1/1984 | Suzuki et al. | 359/599 |
| 4,529,563 | 7/1985 | McGinniss | 264/84 |
| 4,573,766 | 3/1986 | Bournay, Jr. et al. | 362/26 |
| 4,989,933 | 2/1991 | Duguay | 359/599 |

FOREIGN PATENT DOCUMENTS

| | | |
|---|---|---|
| 2054433 | 5/1972 | Germany . |
| 349167 | 11/1959 | Japan . |
| 498711 | 2/1974 | Japan . |
| 57-128383 | 8/1982 | Japan . |
| 58-155947 | 9/1983 | Japan . |
| 59-8809 | 2/1984 | Japan . |
| 61-276831 | 12/1986 | Japan . |
| 2126501 | 5/1990 | Japan . |

OTHER PUBLICATIONS

English language translation of claim of JP-A-34-9167.
English language translation of claim of JP-A-49-8711.
English language translation of claim of JP-B-59-8809.
English language translation of claims of JP-A-57-128383.
English language Abstract of JP reference No. 2-126501.
English language translation of Claims of JP-A-58-155947.
English language Abstract of JP Reference No. 61-276831.
Derwent Publications Ltd. London, GB; AN 89-183663 & JP 1 123 201 May 16, 1989.
Derwent Publications Ltd. London, GB AN 86-058934 & JP 61 010499 Jan. 17, 1986.

Primary Examiner—Scott J. Sugarman
Assistant Examiner—Thong Nguyen
Attorney, Agent, or Firm—Ladas & Parry

[57] ABSTRACT

There is provided a plastics optical member having on its surface a light-diffusing layer composed of a layer of micro-joints formed by immersing a plastics material successively in a good solvent and a poor solvent, and a plastics light-quantity-controlling member having on its surface a white pattern composed of the micro-joints. The superiority in light diffuse reflection, transmission and light-quantity-controlling property permit their incorporation into various optical systems such as screens for projection, various displays, light-source-directly-under-an-illumination-surface type light boxes, edge light type light boxes, etc.

8 Claims, 6 Drawing Sheets

PLASTIC OPTICAL MEMBER AND LIGHT-QUANTITY-CONTROLLING MEMBER EACH HAVING A LIGHT-DIFFUSING LAYER ON ITS SURFACE

TECHNICAL FIELD

The present invention is a technique utilizing light diffusion, and relates to a plastic optical member having a specific micro-joints layer on its surface, and a light-quantity-controlling member having a white pattern of the aforementioned micro-joints on its surface.

Here, the term "optical member" refers to an optical member used in any part of various optical systems in which light is desired to be subjected to diffuse reflection or diffuse transmission. Specific examples thereof are optical members used in planar light sources, projection screens, window materials for building, various displays, office automation appliances, and precision optical instruments. The term "light-quantity-controlling member" refers to a specific optical member used for controlling the quantity of light. Specific examples thereof are optical members for homogenizing the lightness of the illumination surface in the so-called "thin light box" such as a backlight used in liquid crystal displays of personal computers, a schaukasten for medical treatment, an electrically illuminated display, etc., to render the brightness uniform. The optical member and the light-quantity-controlling member commonly utilize the light-diffusing properties imparted by the provision of the aforementioned specific micro-joints layer on the whole or a part of their surfaces.

BACKGROUND ART

Using conventional such as surface chemical treatment, sandblasting method (see JP-B-49-8711), coating with a light-diffusing white coating material (see, for example, JP-B-34-9168), etc., it is difficult to obtain on the surface of a plastic material a thin light-diffusing layer which can be formed partly or in the shape of a pattern, permits adjustment of light diffuse reflection properties and light diffuse transmission properties, and can be formed not only on planar surfaces but also on any curved surfaces. The reason for the difficulty is explained below for each method.

In the surface chemical treatment, a violent reaction is carried out using a strong acid, a strong base, etc., so that the spectral absorption characteristics of the surface of the resulting light-diffusing layer are changed by the chemical reaction. In other words, coloring and the like are caused. Moreover, the chemical treatment merely forms depressions and protuberances in the surface and hence does not impart significant light diffuse reflection properties or light diffuse transmission properties to the surface. Furthermore, when the treatment is carried out so as to form a pattern, it is difficult to prepare a resist which is resistant to the above-mentioned violent chemical reaction.

In the sandblasting method, sand grains are caused to collide with a plastic material at high speeds. For the collision of the grains, high energy is required. In addition, the finer the sand grains, the greater the air resistance, so that the fineness of the plastic material surface achieved by the treatment has its own limit and it cannot be expected to impart very high light diffuse reflection properties or light diffuse transmission properties to the surface of the plastic material.

When a light-diffusing white coating material is applied on a plastic material, the spectral absorption characteristics of the coated material tend to be imbalanced because the light-diffusing white coating material is composed of a white pigment, a binder, various additives, etc. The reason is that in the case of such a coating material, coating properties should be given priority. It is difficult to make the content of the white pigment in the coating material much higher than that of the binder from the viewpoint of the film-forming properties of the coating material. In addition, in this case, it is the boundary surface between the binder and the white pigment that scatters light. A small difference between their refractive indexes results in a small light-scattering effect. Therefore, if a large light diffuse reflection effect is desired, it is necessary to thicken the coating of the light-diffusing white coating material, so that a thin light diffuse reflective layer cannot be realized. Moreover, the light-diffusing white coating material is difficult to be applied on a curved surface.

On the other hand, conventional thin light boxes requiring a uniform illumination surface includes the following two types of light boxes: the so-called edge light type (see, for example, JP-A-57-128383 and JP-A-2-126501) which comprises a light-source provided at a side end of an illumination surface, and a light-quantity-controlling member with a light guide panel having a reflective pattern formed thereon, which member diffuses light from the light source uniformly on the illumination surface; and the so-called lighting curtain type (see, for example, JP-B-59-8809) which comprises a flat housing with an illumination surface on its open side, a light source provided in the flat housing and a light-quantity-controlling member provided right above the light source and containing a translucent reflector called "lighting curtain" which has a reflecting pattern, so as to allow light from the light source to reflect repeatedly between the inner surface of the housing and the light-quantity controlling member to achieve uniform illumination.

The edge light type light box is disadvantageously heavy because it is used together with a light guide panel made of transparent plastic, glass or the like. The edge light type light box is disadvantageous in that the area of light guide portion cannot be increased in proportion to the enlargement of the illumination surface since light is introduced through the end face of the light guide panel, so that the light box is dark.

The lighting curtain type light box is advantageous in that the light box is lightweight and very light because no light guide panel is used therein. However, its assembling is complicated because the positional relationship between the illumination surface and the reflective surface at the inner surface of the housing must be strictly set to obtain a uniform illumination.

In both the edge light type light box and the lighting curtain type light box, a regularly reflecting pattern such as a conventional aluminum-deposited pattern as well as a printed pattern with a white pigment is conventionally used as the reflecting pattern on the light-quantity-controlling member. However, the regularly reflecting pattern has the shortcoming that parallax is caused on the illumination surface, depending on the angle from which the illumination surface is looked at, due to its directivity, although the regularly reflecting pattern has a high reflectance. The printed pattern with a white pigment is disadvantageous in that the reflection wavelength characteristics of the pigment are shifted by various additives added to an ink for printing in order to maintain the printability, resulting in the so-called color shift. Furthermore, in the case of a white pattern obtained by printing, the size of dots constituting the pattern is restricted by printing techniques and cannot be made very small. Therefore, the illumination surface requires an additional light diffuser panel for hiding a dot image since printing of dots with an invisible size is difficult.

SUMMARY OF THE INVENTION

The present invention seeks to solve the various problems in the formation of a thin light-diffusing layer on the surface of a plastic as present material in the prior art, and provides a plastic optical member comprising a plastic material as present having on the surface a light-diffusing layer which has adjustable diffuse reflection properties or light diffuse transmission properties, can be formed partly or in the shape of a pattern, on any curved surfaces, and has a flat spectral absorption distribution. In addition, the present invention is seek to solve the above-mentioned various problems in conventional light-quantity-controlling means in light-quantity-controlling members for adjusting the quantity of transmitted light and the quantity of reflected light, and provides a light-quantity-controlling member which makes it possible to obtain a bright box that is lightweight, very light, and easy to construct and hardly causes parallax, and which member is free from color irregularities and has a simple structure.

Further in the present invention, these objects are achieved by forming a light-diffusing layer on the surface of a plastic material. The light-diffusing layer comprises micro-joints formed on the surface of the plastic material.

For forming such micro-joints, the plastic material is immersed in a good solvent (hereinafter referred to also as first solvent) for the constituent plastic of the plastic material, and then in a poor solvent (hereinafter referred to also as second solvent) for the constituent plastic which is compatible with the first solvent. By this procedure, the light-diffusing layer is formed on the surface of the plastic material. Each solvent may be either a single solvent or a mixed solvent. In general, when an object is increased in volume by swelling, dissolution, melting, etc., and returns to its original state, it shrinks toward the centers of shrinkage scattered in the object. Owing to the cracks or spaces formed by the shrinkage between the centers of shrinkage, numerous laminated structures in a pillar shape, a string shape, a plate shape or a spherical shape are formed near the surface of the object, and they are called joints.

In some cases, the joint structures become spongy or felt-like depending on the shrinkage rate and the flexibility and brittleness of the object. Their sizes reach several micrometers to several tens of centimeters in some cases.

The present inventors found that by the above-mentioned immersion of the plastic material in the good solvent and then in the poor solvent, extremely minute joints are formed on the surface of the plastic material.

These micro-joints are assemblies of very small cracks formed by expansion of a surface portion of the plastic material, followed by the rapid shrinkage thereof. The cracks are formed in a very small size with very high density in the surface portion of the plastic material. Furthermore, the cracks are formed in multi-layers in the direction of the depth of the plastic material. The cracks provide a very large boundary surface area between air and the constituent plastic of the plastic material. Since light is scattered at the boundary surfaces, there are an extremely large number of portions from which light is scattered. Therefore, a large light-diffusing effect can be obtained even by using a thin light-diffusing layer.

When such a light-diffusing layer comprising micro-joints as described above is formed on the surface of a plastic material by treatment with the solvents, the surface portion of the plastic material is at first swollen by the immersion of the plastic material in a first solvent which is a good solvent for the constituent plastic of the plastic material. The swelling is caused by the expansion of the surface portion of the plastic material. This expansion is caused by the intrusion of the molecules of the solvent between the molecules of the constituent plastic. When the plastic material in this state is immersed in a second solvent which is a poor solvent for the plastic, the molecules of the first solvent present between the molecules of the plastic are replaced by the molecules of the second solvent, so that the molecules of the plastic are rapidly shrunk and solidified. Therefore, a large number of cracks are formed and become micro-joints.

In this case, unless the first solvent and the second solvent are compatible with each other, the molecules of the first solvent are not smoothly replaced by the molecules of the second solvent, and hence no uniform micro-joints are formed. Therefore, the first solvent and the second solvent must be compatible with each other. Owing to this compatibility, the molecules of the first solvent are gradually replaced by the molecules of the second solvent as the ratio of the former to the latter is changed, so that uniform micro-joints are formed.

Thus, the micro-joints according to the present invention have a structure composed of very small cracks and spaces integrated closely with high density. The appearance of the micro-joints slightly varies depending on the kind of the constituent plastic to be treated, the kinds of the first and second solvents, immersion method, immersion temperature, immersion time, etc. For example, the micro-joints appear as assemblies of very small cracks or appear spongy or felt-like. However, the micro-joints serve as the light-diffusing layer of an optical member, irrespective of their appearance.

The average thickness (depth) of the micro-joints layer obtained in the present invention is 1 to 30 $\mu$m. A micro-joints layer having an average thickness of 10 to 20 $\mu$m is particularly preferable for a light-diffusing layer. The average distance between the cracks or spaces formed is 0.01 to 50 $\mu$m, and in particular, in an optical member is preferably 0.02 to 20 $\mu$m.

The outstanding advantages of the micro-joints are as follows: the micro-joints provide a very high light diffuse reflectance (a high whiteness degree of the surface); they do not peel off because they are integral with the substrate (they have the same quality as that of the substrate) and provide a higher surface strength as compared with the coating with a white pigment, etc. The micro-joints also have advantages in their production. For example, their characteristics can easily be chosen by changing the kinds of the solvents employed and the conditions of the treatment.

As regards the plastic material used as the optical member or the light-quantity-controlling member of the present invention, the micro-joints layer can be formed on the surface of any kind of plastic so long as there is a good solvent for the plastic. Examples of plastic include homopolymers such as acrylic resin (e.g. PMMA), polyester resin (e.g. PET), polycarbonate, polyolefin (e.g. polyethylene), polystyrene, polyamide, polyoxymethylene, polyvinyl chloride and the like, and copolymers such as ABS, AS and the like. These plastic can be used even when they are not particularly transparent.

As a method for allowing the first solvent and the second solvent to act on the plastic, any methods can be employed, such as immersion in each of the solvents, exposure to the vapor of each of the solvents, spraying each of the solvents onto the surface, coating of the surface with each of the solvents, etc. Since the second solvent replaces the first solvent which has already swollen the surface portion of the plastic, it is necessary to supply a large amount of the second solvent to the surface.

As described above, the plastic material having a light-diffusing layer comprising the micro-joints as a white surface for carrying out light diffuse reflection provides highly efficient and dense diffuse-reflected light. The plastic material can be employed for the production of a diffuse reflector used in various illuminators, a material constituting the inner surface of a light box, a projection screen, etc. Particularly when the material is utilized as a projection screen, a light and highly clear projected image can be obtained owing to the thin light-diffusing layer and the dense surface thereof.

The light-quantity-controlling member of the present invention for adjusting the quantity of transmitted light and for adjusting the quantity of reflected light has a light-quantity-controlling means comprising a white pattern comprising micro-joints formed on the surface of a plastic material. Such a light-quantity-controlling means can be formed as follows. Before forming the white pattern comprising the micro-joints, the surface of the plastic material is masked with a resist such as photoresist which is insoluble in both the first and second solvents, wherein the first solvent is a good solvent for the constituent plastic, and the second solvent is a poor solvent for the constituent plastic and is compatible with the first solvent. The plastic material thus treated is immersed successively in the first solvent and then in the second solvent.

In the present invention, the surface of the plastic material in which the white pattern is to be formed is masked with a resist insoluble in both the first solvent (a good solvent for the plastic material) and the second solvent (a poor solvent for the plastic material), while leaving a portion to be patterned. Then, the plastic material thus treated is immersed in the first solvent. At this time, a portion not masked with the resist is allowed to swell and increase in volume.

Figure 2:
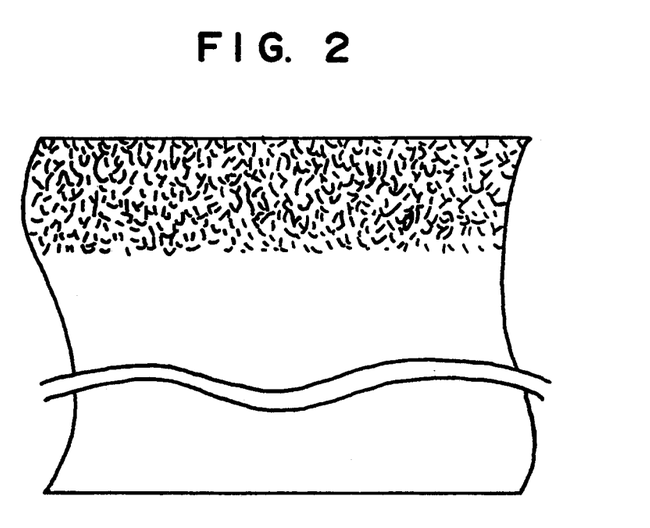
FIG. 2 is a schematic view of one example of a section of the light-diffusing layer comprising the micro-joints.
Figure 3:
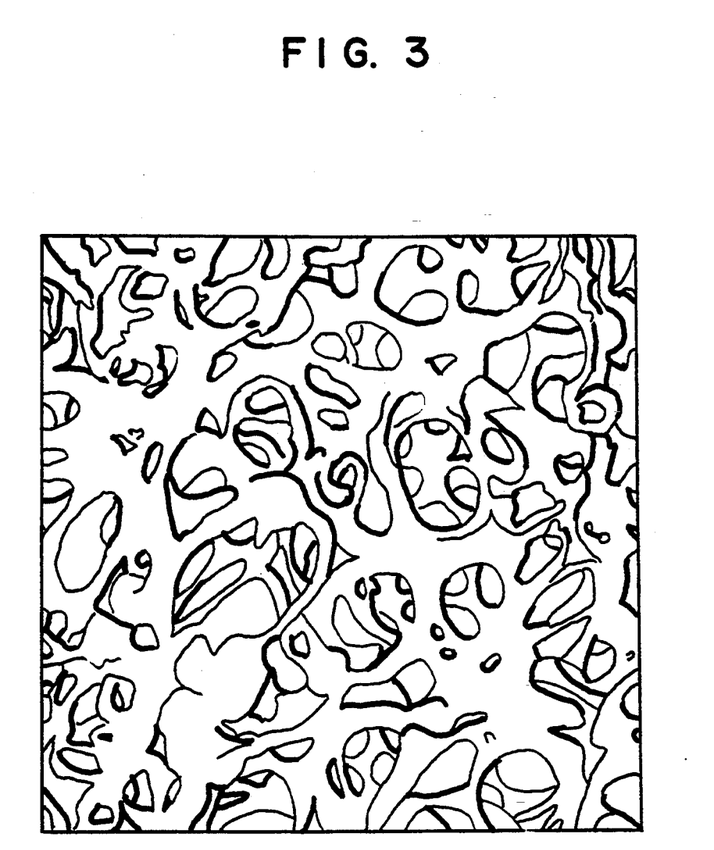
FIG. 3 is a schematic illustration of the micro-joints of the present invention at a magnification of 5,000.
Figure 4:
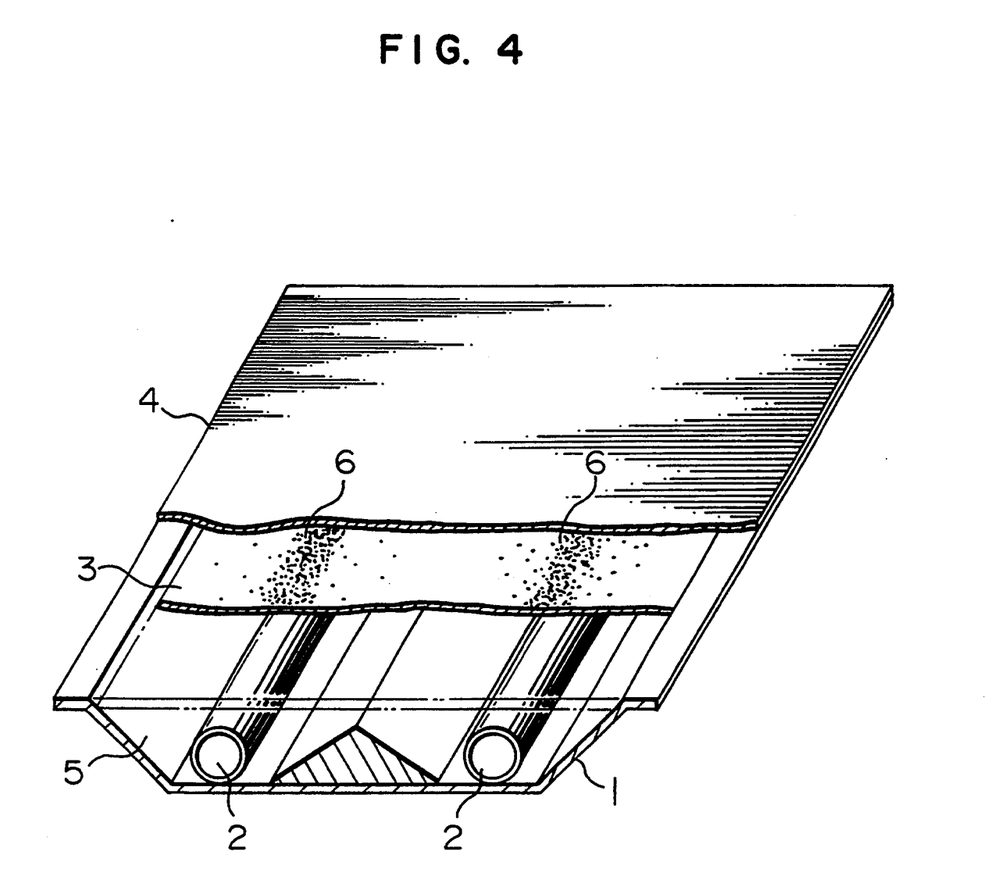
FIG. 4 is a partial perspective view of the light-quantity-controlling member of the present invention.

The immersion of the plastic material in the second solvent causes rapid replacement of the first solvent by the second solvent due to the compatibility between these solvents, and results in the rapid shrinkage and solidification of the swollen portion, which lead to the formation of numerous extremely minute cracks. Since the plastic material has low crystallinity, the cracks constitute a layer of the so-called micro-joints which are irregularly placed one upon another in a large number in the direction of the depth of the plastic material, as can be seen from FIG. 2 and FIG. 3 given hereinafter.

The removal of the solvent on the surface and of the resist forms a sharp pattern composed of a micro-joints layer on the surface of the plastic material. The micro-joints in the white pattern constitute a multiple voids layer having an average distance between the voids of 0.01 to 50 $\mu m$ and an average layer thickness of 1 to 30 $\mu m$.

When the pattern comprising the micro-joints layer formed on the surface of the plastic material in the manner as described above is irradiated with light, the cast light carries out repeated reflection and refraction due to the existence of a large number of the very small cracks which are densely and irregularly overlaid in the direction of the depth of the plastic material. Therefore, in spite of the thinness of the layer of the micro-joints, the pattern has a high whiteness and a very high non-directional reflectance.

As described above, the white pattern comprising a micro-joints layer repeats reflection and refraction very many times in three dimensions in the thin layer. Therefore, the white pattern exhibits extremely excellent effective diffusion, per unit transmittance, than does an etched surface or a sandblasted surface, whose diffusion is mainly attributable to planar reflection and refraction. Accordingly, the white pattern layer can be made thinner, whereby light loss is reduced. Therefore, the light-quantity-controlling member of the present invention having the white pattern comprising micro-joints efficiently reflects or refracts the light thereby to enable accurate and non-directional control of the light.

The light-quantity-controlling member of the present invention does not contain any factor which changes the wavelength characteristics of the light at the time when the member reflects or refracts the light. Therefore, the member does not cause color shift.

Embodiments of the present invention are explained below.

The symbols employed in these figures denote as follows.

1 - - - housing,
2 - - - light source,
3 - - - light-quantity-controlling member,
4 - - - light diffuser panel,
5 - - - reflective surface,
6 - - - white pattern,
7 - - - light-quantity-controlling member,
8 - - - white layer,
9 - - - transparent member,
10 - - - light-quantity-controlling member,
11 - - - light diffuse transmission member, 12 - - - reflective sheet,
13 - - - light guide member,
14 - - - reflecting pattern,
15 and 15' - - - white pattern comprising a micro-joints layer,
16 - - - light-quantity-controlling member,
17 - - - light-quantity-controlling member,
18 - - - housing.

BEST MODE FOR CARRYING OUT THE INVENTION

The present invention is further illustrated below with examples.

EXAMPLE 1

A 30 mm×80 mm transparent polymethyl methacrylate plate was immersed in dichloromethane (a first solvent) for 30 seconds and then in n-hexane (a second solvent) for 60 seconds, and dried to form a white light-diffusing layer on the surface of the polymethyl methacrylate plate. In the formation of the light-diffusing layer, one side of the polymethyl methacrylate plate was covered with an adhesive tape made of polyester so that the light-diffusing layer was formed only on the other side of the polymethyl methacrylate plate which was exposed to the solvents. After the formation of the light-diffusing layer, the adhesive tape was peeled off.

The reflection optical density of the light-diffusing layer thus formed on the surface of the polymethyl methacrylate plate was measured with a photographic densitometer (Model P-2, mfd. by Fuji Photo Film Co., Ltd.) [the reflection optical density is expressed by the equation $D = \log(I_0/I)$ (log: common logarithm) wherein D is the value of the reflection optical density, $I_0$ is the intensity of an incident light, and I is the intensity of a reflected light]. A sheet of black felt was brought into close contact with the reverse side of a sample to be measured, whereby the light transmitted through the light-diffusing layer was absorbed.

The reflection optical density of the light-diffusing layer formed on the surface of the polymethyl methacrylate plate was 0.03, and the value corresponds to a reflectance of 93%. Thus, the light-diffusing layer has sufficient light diffuse reflection properties and hiding power as a white layer.

Figure 1:
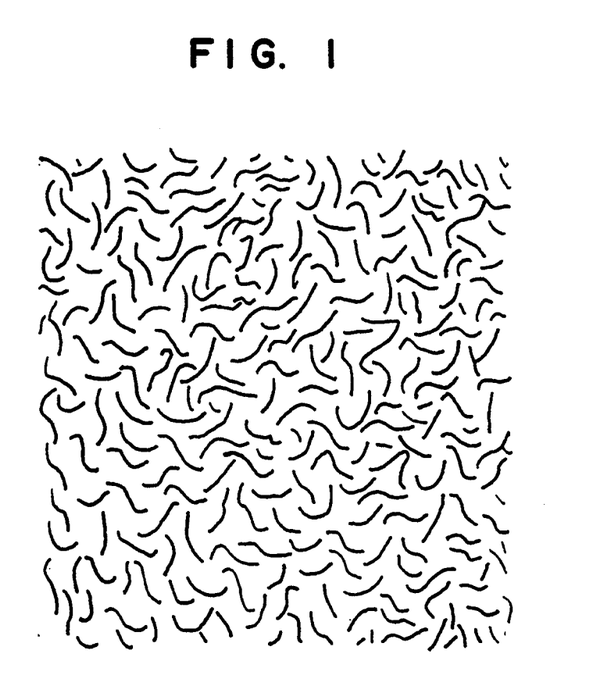
FIG. 1 is a schematic view of one example of the surface of a light-diffusing layer comprising the micro-joints of the present invention observed under a microscope.

Observation of the light-diffusing layer formed on the surface of the polymethyl methacrylate plate under a microscope demonstrated that there were micro-joints composed of numerous extremely minute and irregular cracks on the surface of the polymethyl methacrylate plate. As mentioned above, the micro-joints observed under the microscope are schematically shown in FIG. 1.

Microscopic observation of a section of the polymethyl methacrylate plate having the light-diffusing layer on the surface revealed that the thickness of the light-diffusing layer was about 20 μm. The section observed under a microscope is schematically shown in FIG. 2. Each of FIG. 1 and FIG. 2 merely shows an example, and the size and shape of the micro-joints vary depending on the conditions at the formation of the light-diffusing layer.

When visually observed, the light-diffusing layer formed on the surface of the polymethyl methacrylate plate was pure-white, had a very dense surface shape, and showed no directional property of surface profile at all. This is considered to be due to the non-crystalline, amorphous structure of the polymethyl methacrylate plate.

For comparison, the same polymethyl methacrylate plate is sandblasted on one side and the above-mentioned reflection optical density was measured. The reflection optical density was 0.62. When visually observed, the sandblasted surface was not so white and was rough.

Next, a white coating material comprising titanium oxide as a white pigment was applied on one side of a polymethyl methacrylate plate to a thickness of 20 μm. The thickness was the same as that of the aforesaid light-diffusing layer composed of the micro-joints formed by the method of the present example. In this case, the reflection optical density was 0.08. For further reducing the reflection optical density, the coating thickness or the titanium oxide content in the white coating material may be increased. However, even when either of these factors is increased, the application of the white coating material becomes difficult and the formation of a dense layer on the surface of the polymethyl methacrylate plate becomes impossible.

In the present example, the transparent polymethyl methacrylate plate was used merely for showing the result of evaluation of the formed light-diffusing layer composed of the micro-joints in terms of the reflection optical density. As mentioned above, the plastic material used in the present invention is not limited to transparent plastic plates.

In the method of the present example, it is sufficient to immerse the plastic material successively in the first solvent and then in the second solvent. Therefore, whatever shape the plastic material may have, the light-diffusing layer can be formed on the surface of the plastic material in the same manner as described above.

EXAMPLE 2

A light diffuse reflective layer of micro-joints was formed on the surface of each of 3 kinds of plastic plates in the same manner as in Example 1, except for replacing the first solvent and the second solvent. The reflection optical density was measured in the same manner as in Example 1.

For choosing solvents as the first solvent and the second solvent, respectively, the value of solubility parameter can be used.

The definition of solubility parameter is shown below:

$$SP = \sqrt{\frac{C}{M}(\Delta H - RT)}$$

SP: solubility parameter,
ΔH: latent heat of vaporization,
R: gas constant (cal/mole),
C: density (g/cc),
M: gram-molecular weight (g/mol),
T: absolute temperature.

When a polymethyl methacrylate plate is used as a transparent plastic plate, the value of solubility parameter (hereinafter referred to as SP value) of the first solvent, i.e. the good solvent, is preferably between 9.0 and 9.8, more preferably between 9.3 and 9.7. It is sufficient that the SP value of the second solvent, i.e. the poor solvent, is 9.9 or more, or 8.8 or less. As the second solvent, there can be exemplified alcohols, glycols, chain hydrocarbons and cyclic hydrocarbons.

Table 1 shows examples of the formation of a light diffuse reflective layer of micro-joints in the surface of a polymethyl methacrylate plate by immersion of the polymethyl methacrylate plate in each of the first solvents having different solubility parameters for 30 seconds and then in ethanol (SP value=12.7) as the second solvent for 60 seconds. For the layers of micro-joints which remained transparent, the symbol T is written in the table instead of measuring the reflection optical density.

TABLE 1

| First solvent | SP value | Reflection optical density |
| --- | --- | --- |
| Xylene | 8.8 | T |
| Benzene | 9.2 | 0.83 |
| Chloroform | 9.3 | 0.32 |
| Chlorobenzene | 9.5 | 0.28 |
| Dichloromethane | 9.7 | 0.34 |
| Dioxane | 9.9 | T |

Table 2 shows the results obtained under the same conditions as in Table 1, except that n-hexane (SP value=7.3) was used as the second solvent.

TABLE 2

| First solvent | SP value | Reflection optical density |
| --- | --- | --- |
| Xylene | 8.8 | T |
| Benzene | 9.2 | 1.24 |
| Chloroform | 9.3 | 0.03 |
| Chlorobenzene | 9.5 | 0.02 |
| Dichloromethane | 9.7 | 0.03 |
| Dioxane | 9.9 | T |

Table 3 shows the results obtained under the same conditions as in Table 1, except that dichloromethane (SP=9.7) was used as the first solvent and each of various solvents was used as the second solvent.

TABLE 3

| Second solvent | SP value | Reflection optical density |
| --- | --- | --- |
| Ethanol | 12.7 | 0.34 |
| Dioxane | 9.9 | 0.08 |
| Xylene | 8.8 | T |
| Carbon tetrachloride | 8.5 | 0.98 |
| Cyclohexanone | 8.2 | 0.03 |
| n-Hexane | 7.3 | 0.03 |

When water was used as the second solvent, only large cracks were formed and no light diffuse reflective surface was formed.

From the above results, it was found that the first solvent can be chosen on the basis of SP value. The second solvents with relatively small SP value was able to form a micro-joints layer having higher light diffuse reflection property and more uniform structure than did the second solvents with relatively large SP values. This is because, at the time of the immersion of the polymethyl methacrylate plate in the second solvent, the second solvents having a relatively large SP value replaced the first solvent present on the surface of the plate more rapidly than did the second solvents having a relatively small SP value. This is due to the dominant influence of the solvent having a larger SP value in the mixture of two solvents with different SP values.

Next, Table 4 shows examples of formation of a light diffuse reflective layer of micro-joints on the surface of a polycarbonate plate as a transparent plastic plate by immersion of the polycarbonate plate in each of various first solvents for 30 seconds and then in n-hexane as the second solvent for 60 seconds.

TABLE 4

| First solvent | SP value | Reflection optical density |
| --- | --- | --- |
| Carbon tetrachloride | 8.5 | T |
| Xylene | 8.8 | 0.02 |
| Benzene | 9.2 | Nonuniform |
| Chloroform | 9.3 | Nonuniform |
| Dichloromethane | 9.7 | Nonuniform |
| Dioxane | 9.9 | 0.24 |
| Acetone | 10.0 | T |

In the case where a light diffuse reflective layer of micro-joints is formed on the polycarbonate plate, a first solvent having an SP value of from 8.6 to 9.9 is used for forming the light diffuse reflective layer of micro-joints. When a first solvent having an SP value of from 9.1 to 9.7 is used, the surface portion of the polycarbonate plate is dissolved in the first solvent and flows out when immersed in the second solvent. As a result, only a nonuniform light diffuse reflective layer of micro-joints is formed. Accordingly, it is necessary to select a solvent having an appropriate solubility as the first solvent. As the second solvent used for the polycarbonate plate, a solvent having an SP value of 8.5 or less or 10.5 or more can be used, and a solvent having an SP value of 8.0 or less is preferable. Use of a solvent having an SP value of 8.0 to 8.5 as the second solvent reduces the light diffuse reflection property of the formed layer. Use of a solvent having an SP value of 10.5 or more as the second solvent makes the formation of a uniform light diffuse reflective layer of micro-joints difficult.

Table 5 shows examples of formation of a light diffuse reflective layer of micro-joints on a polystyrene plate as a transparent plastic plate by immersion of the polystyrene plate in each of various first solvents for 30 seconds and then in n-hexane as second solvent for 60 seconds.

TABLE 5

| First solvent | Sp value | Reflection optical density |
| --- | --- | --- |
| Methylcyclohexane | 7.8 | T |
| Cyclohexane | 8.2 | 0.08 |
| Carbon tetrachloride | 8.6 | 0.04 |
| Benzene | 9.2 | Nonuniform |
| Dichloromethane | 9.7 | Nonuniform |
| Acetone | 10.0 | Nonuniform |
| Dibromomethane | 10.4 | T |

In the case where a light diffuse reflective layer of micro-joints is formed on the polystyrene plate, a first solvent having an SP value of from 8.0 to 10.2 is used for forming the light diffuse reflective layer of micro-joints. When a first solvent having an SP value of from 8.5 to 10.0 is used, the surface portion is dissolved in the first solvent and flows out when immersed in the second solvent. As a result, only a nonuniform light-diffusing layer of micro-joints is formed. Accordingly, it is necessary to select a solvent having an appropriate solubility as the first solvent. As the second solvent for the polystyrene plate, a solvent having an SP value of 8.0 or less or 10.5 or more can be used, and a solvent having an SP value of 8.0 or less is preferable for forming a uniform light-diffusing layer of micro-joints.

From the present example, it can be seen that light-diffusing layers of micro-joints in different states are formed by replacing the first solvent and the second solvent. This means that layers of micro-joints having various light diffuse reflection property can be formed by properly choosing the first solvent and the second solvent. That is, the method of the present example can be used not only for forming a light diffuse reflective white layer but also for forming a light diffuse transmission layer.

For all the samples produced in the present example, spectral transmittance distribution was measured with a double beam spectrophotometer Model 124 manufactured by Hitachi, Ltd. which had been equipped with an integrating sphere. As a result, it was found that the samples showed the same characteristic distribution as that of the plastic plate serving as the substrate. Therefore, it can be seen that the formed light diffuse reflective layers of micro-joints are free from shift of spectral absorption distribution, for example, coloring.

The present example indicates that a light diffuse reflective or light diffuse transmission layer of the micro-joints formed by the method of the present invention can be utilized not only for a light diffuse reflector, as described in Example 1, but also for a light diffuse transmission panel. Therefore, the layer of micro-joints is advantageously high in the density and efficiency in the utilization of light when it is applied to a light diffuser panel used for providing a planar light source using an electric lamp or a fluorescent lamp, a translucent projection screen, a window material for a building, etc.

In the present example, a polymethyl methacrylate plate, a polycarbonate plate and a polystyrene plate were used as plastic plates. However, as described above, any plastic can be used so long as it has a good solvent capable of swelling the surface of the plastic. Therefore, the plastic plate used for the present invention is not limited to the above three kinds of plastic plates.

Also, the transparency and shape of the above plastic plates are not limiting factors of the present invention as neither are they in Example 1.

In addition, the immersion times in the first solvent and the second solvent are determined as follows: When the immersion time in the first solvent is too long, the surface of the plastic plate is excessively dissolved. When it is too short, no layer with sufficient light-diffusing property can be obtained. Although no serious problem is caused when the immersion time in the second solvent is too long, when it is too short, no layer with sufficient light-diffusing property can be obtained. The immersion times employed in the present example are mere examples and the optimum immersion time depends on specific conditions.

EXAMPLE 3

Example 2 reveals that the light diffuse reflection properties of a light diffuse reflective layer of the micro-joints formed on the surface of a transparent plastic plate vary depending on the kind of the first solvent and the second solvent selected on the basis of SP value. However, use of a single solvent does not permit optional, stepless adjustment of the light diffuse reflection property even when it is intended. Instead, a mixed solvent having an optionally synthesized SP value can be obtained by mixing two or more solvents having different SP values.

The examples below show the formation of a light diffuse reflective layer of micro-joints on the surface of a polmethyl methacrylate plate by immersing the plate successively in a first solvent obtained by mixing dichloromethane (SP value=9.7) and carbon tetrachloride (SP value=8.5), and n-hexane as the second solvent. In this case, adjustment of the light diffuse reflection property of the layer of micro-joints was proved to be possible by varying by steps the mixing ratio between dichloromethane and carbon tetrachloride in the first solvent. The immersion times were 30 seconds in the first solvent and 60 seconds in the second solvents. The results are shown in Table 6.

TABLE 6

| Dichloromethane/carbon tetrachloride | Reflection optical density |
| --- | --- |
| 10/0 | 0.03 |
| 9/1 | 0.03 |
| 8/2 | 0.03 |
| 7/3 | 0.03 |
| 6/4 | 0.04 |
| 5/5 | 0.07 |
| 4/6 | 0.15 |
| 3/7 | 0.53 |
| 2/8 | 1.32 |
| 1/9 | T |
| 0/10 | T |

Microscopic observation of a section of each of the samples showed that in spite of the variation in thickness of light diffuse reflective layer of the micro-joint, the micro-joints themselves were similarly formed.

Although the mixing ratio was varied by steps of 10% in the above case, the light diffuse reflection property can be fairly finely adjusted by precisely adjusting the mixing ratios within the range in which the light diffuse reflection property is greatly influenced.

A layer of micro-joints having an optional light diffuse reflection property can be formed by the use of a mixed solvent as in the present example, and it can be utilized in optical members for adjusting the quantity of light or light diffusion in precision optical instruments, etc. For example, uniform illumination can be achieved by properly placing the optical member possessing an adjusted light diffuse reflection property in a light box used as a thin backlight used in office automatic appliances, etc. The optical member produced according to the method of the present example which has an optional surface light diffuse reflection property widens the degree of freedom of design of such light boxes.

Although mixed solvents of dichloromethane and carbon tetrachloride were used as examples of a mixed solvent in the present example, any combination of solvents may be employed for forming on a plastic material a layer of micro-joints possessing a desired light diffuse reflection property.

Although a polymethyl methacrylate plate was used in the present example, any plastic may be used so long as they have a good solvent capable of swelling their surface.

In addition, a mixed solvent may be used as either the first solvent or the second solvent. The same advantage as described above can be expected by the use of a mixed solvent as the second solvent.

EXAMPLE 4

This example presents the production of a special screen for measurement used for projecting images on a hemispheric convex surface as an example of partially forming a light diffuse reflective layer of micro-joints on a plastic material.

An aqueous gelation solution was applied on the outside flat surface of a hemisphere made of a polymethyl methacrylate, and dried. Thereafter, the whole body of the hemisphere was immersed in dichloromethane as a first solvent for 30 seconds then in n-hexane as a second solvent for 60 seconds. After drying, the hemisphere was immersed in boiling water to remove the gelatin applied on the flat surface of the hemisphere, whereby a polymethyl methacrylate hemisphere having a light diffuse reflective layer of the micro-joints formed only on its curved surface portion was produced.

Thus, formation of a light diffuse reflective layer of micro-joints can be prevented at a portion where the layer is not desired to be formed on a plastic material substrate by applying to the portion a solution of a resin (e.g. a water-soluble resin) which is not damaged by the first and second solvents and is soluble in another solvent not damaging the plastic material and drying the solution-applied substrate.

Since the method for forming a light diffuse reflective layer of micro-joints in the present invention comprises only successive immersion of a plastic material substrate in which the layer of micro-joints is to be formed in the first and second solvents, the layer of micro-joints can be formed irrespective of the shape of the substrate. In the case where the plastic material in which the layer of micro-joints is to be formed is large, the first and second solvents can be allowed to act on the plastic material by using a shower or a spray instead of the immersion in the first and second solvents. Actually, an experiment carried out by using a spray resulted in the same effect as that obtained by the immersion.

Thus, a light diffuse reflective layer of micro-joints can be formed in parts on plastic materials of various shapes. Therefore, for example, an optical member having both light diffuse reflection property and light refraction property can be produced by forming the layer of micro-joints on one side of a lens or one plane of a prism.

A specific example of the production is as follows. A reticle used in the view finder of a single-lens reflex camera and a condenser lens to be placed on the reticle could be integrally produced by forming the layer of micro-joints only on the flat front surface of a lens with a flat front surface and convex rear surface. Thereby, a dense and bright view finder could be realized with reduction of the weight and number of parts.

EXAMPLE 5

This example presents the production of an optical member for rendering light uniform i.e. a light-quantity-controlling member, by adjusting the quantity of light by partial diffusion of light as an example of formation of a light diffuse reflective layer of micro-joints making a pattern form on the surface of a plastic material.

A photosensitizer composed of an aqueous solution of a water-soluble resin and a photo-crosslinking agent was applied on one side of a polymethyl methacrylate plate and dried to form a photosensitive layer. Prior to the application of the photosensitizer, the whole surface of the opposite side of the polymethyl methacrylate plate had been covered with a polyester adhesive tape.

A film pattern mask or the like was placed on the photosensitive layers. The layer was exposed to ultraviolet light with a high pressure mercury lamp. The plate with the light-exposed layer was immersed in warm water at 40° and the water was stirred. Thus, the unexposed portion of the photosensitive surface was washed away. Thereafter, the polymethyl methacrylate plate was immersed successively in chloroform as a first solvent and n-hexane as a second solvent. In this step, a light diffuse reflective layer of micro-joints was formed on the unexposed portion. Then, the polymethyl methacrylate plate was immersed in boiling water to peel off the crosslinked photosensitive layer. Finally, the polyester adhesive tape on the opposite side was removed.

Thus, a pattern of a light diffuse reflective layer of micro-joints could be formed on the surface of the polymethyl methacrylate plate.

In the present example, a water-soluble resin containing a photo-crosslinking agent was selected as a resist layer for forming a pattern of the light-diffusing layer of micro-joints. However, any resists can be used so long as they are soluble in a solvent (a developing solvent) for washing away the portion not exposed to light, become insoluble by light irradiation, are peeled off from a plastic substrate by a peeling solvent to which the substrate is resistant, and are resistant to the first and second solvents.

For allowing the first and second solvents to act so as to form the pattern as described above, there can be employed not only immersion but also showering and spraying.

A specific example of light-uniformizing techniques is the technique used in a backlight for displays for office automatic appliances, etc. Formation of a reflective-pattern on a transparent plate for rendering light uniform by the method of the present example enabled the production of a thin backlight uniform in every angle.

Another method of rendering light uniform employed for a thin backlight is a technique called an edge light method. The technique comprises allowing light from two fluorescent lamps to enter through the two facing edges of a transparent plastic plate called a light guide panel so as to uniformly illuminate one flat side of the transparent plastic plate by diffused and reflected light by a pattern formed on the opposite flat side. Formation of a reflective pattern on a light guide panel by the method of the present example enabled the preparation of a uniform planar light source brighter than that prepared by a method using the prior art.

EXAMPLE 6

Figure 5:
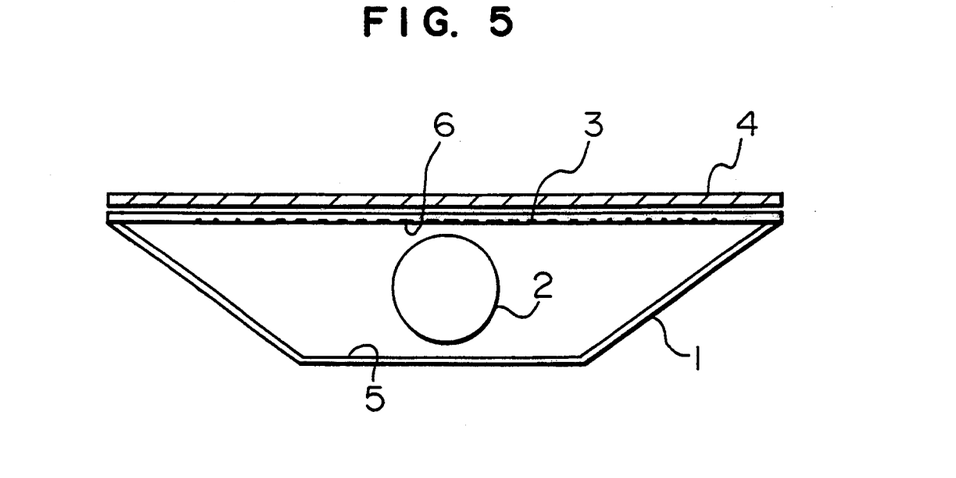
FIG. 5 shows another example of the light-quantity-controlling member of the present invention.

FIG. 5 is a sectional side view of a thin light box (a light-source-directly-under-an-illumination-surface type light box) using a light-quantity-controlling member, an example of the present invention. In the figure, a straight fluorescent tube 2 is provided as a light source in a flat box 1 having a reflective surface 5 formed on the inner wall, and a translucent diffuser panel 4 is provided as an illumination surface on the open side of the box 1. A light-controlling member 3 called a lighting curtain is provided between the light diffuser panel 4 and the light source 2, whereby the brightness on the illumination surface is controlled so as to become uniform.

The lighting curtain 3 is produced by forming a pattern of dots of 25 mesh composed of micro-joints on a polymethyl methacrylate plate (hereinafter referred to as acrylic plate) so that the density may be decreased as the distance from the light source is increased.

Such a pattern of dots composed of a layer of micro-joints on the lighting curtain 3 was formed by covering one side of a transparent acrylic plate with a polyester adhesive tape; coating the opposite side with an aqueous solution containing 1 part of a condensation product of p-diazophenylamine and paraformaldehyde and 19 parts of gelatin using a 0.2 mm wire bar; drying the resulting coating while blowing air at room temperature to form a photoresist layer; bringing a silver salt film having a pattern printed thereon into close contact with the photoresist layer; exposing the film to light from a 1-KW high-pressure mercury lamp for 2 minutes; immersing the acrylic plate in warm water at 40° C. to wash away the portion of the photoresist layer not exposed to the light; immersing the washed acrylic plate in chloroform as a first solvent for 30 seconds; and then immersing the resulting plate in n-hexane as a second solvent for 2 minutes to form a pattern of dots on the surface of the light-exposed surface of the acrylic plate. Finally, the photoresist layer was peeled off using boiling water at 90° C.

The reflectance and transmission density of the lighting curtain 3 thus produced were 95% and 1.80, respectively. The results show the superiority of the lighting curtain 3 in whiteness and light-diffusing property. The light box of FIG. 5 equipped with the lighting curtain 3 was brighter than conventional light boxes by 10% or more. Nevertheless, it does not permit visual observation of the dots of the pattern nor parallax. Accordingly, the construction of the light box was very simple.

EXAMPLE 7

Figure 6:
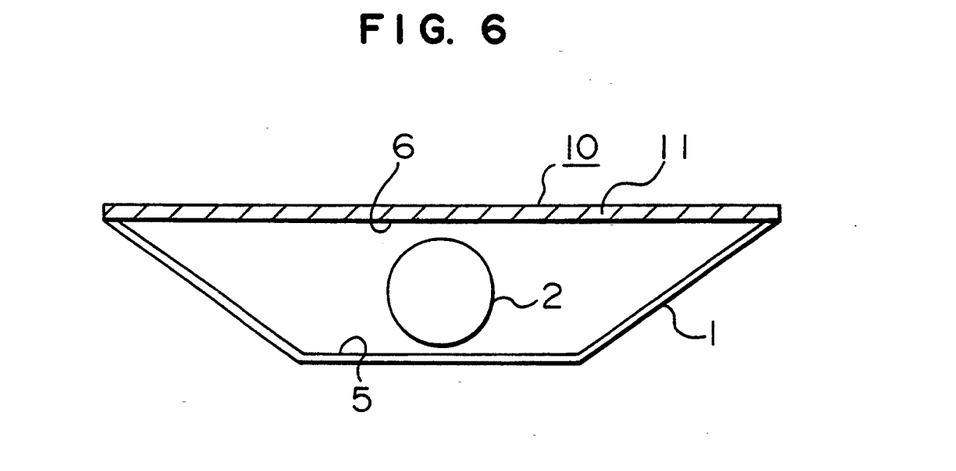
FIG. 6, FIG. 7, FIG. 8, FIG. 9, FIG. 10 and FIG. 11 are sectional side views of other examples of the present invention.

FIG. 6 is a sectional side view of a backlight equipped with a light-quantity-controlling member, another example of the present invention. This backlight was formed by attaching a light-quantity-controlling member 10 of the present invention to the opening of a flat box 1 having the same light source 2 as in Example 6 in the interior.

The light-quantity-controlling member 10 was produced by forming a pattern of white dots of 200 mesh composed of a layer of micro-joints on one side of a thin light diffuse transmissive member 11 (thickness: 1 mm) made of an acrylic resin (a milk white plate #435, mfd. by Mitsubishi Rayon Co., Ltd.) in the same manner as in Example 1.

The superiority in whiteness and diffuse reflection property of the layer of micro-joints thus formed prevents projection of shadows by the dots on an illumination surface as caused by the dots formed by metallizing in spite of the thinness of the light diffuse transmissive member 11 made of plastic used as a substrate.

Therefore, the backlight of FIG. 6 equipped with the light-quantity-controlling member 10 provided a very bright illumination surface. The illumination surface was free from parallax attributable to high light-diffusing property of the dots pattern. Also, it was free from light nonuniformity which tends to be caused by a slight change of the relation between the positions of the members. Accordingly, the construction of the backlight was very simple.

The substrate constituting the light-quantity-controlling member need not be transparent as in the present example. Still higher performance characteristics of the light-quantity-controlling member can be achieved by using a plastic plate having, for example, a function of diffusing light. Therefore, the plastic material used in the present invention need not be transparent.

EXAMPLE 8

Figure 7:
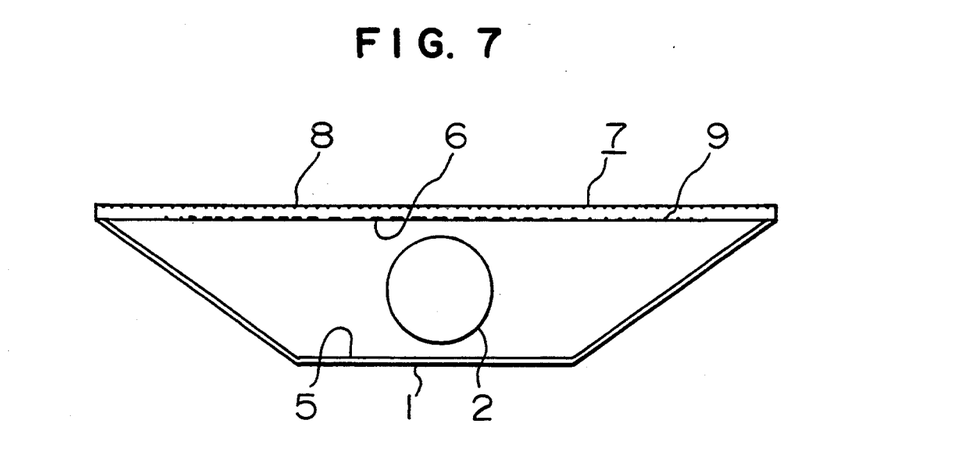

FIG. 7 is a sectional side view of a backlight equipped with a light-quantity-controlling member of still another example of the present invention.

The figure shows a light box which comprises a flat box 1 having the same reflective surface at the inner wall as in Example 6, a light source 2 provided in the flat box and a light-quantity-controlling member 7 of the present invention attached to the opening of the box 1.

The light-quantity-controlling member 7 comprises a transparent polycarbonate plate 9 having a thickness of 0.5 mm, a white layer composed of a layer of micro-joints 8 formed on the whole surface of one side of the plate and the same white layer of micro-joints 6 as above having a pattern of dots of 200 mesh formed on the opposite side of the plate.

The dot density of the pattern of dots 6 on the light-quantity-controlling member 7 is designed to be decreased as the distance from the light source is increased. Repeated reflection of the light from the light source 2 between the white pattern of dots 6 and the reflective surface 5 on the inner wall of the box and diffusion of the light during its transmission through the white layer 8 on the surface of the light-quantity-controlling member 7 results in uniform illumination on the surface of the light-quantity-controlling member 7.

The pattern of dots 6 was formed by masking one side of the transparent polycarbonate plate 9 with the same photoresist as used in Example 1 while leaving portions for pattern, and immersing the thus treated plate 9 successively in xylene as a first solvent for 1 minute and n-hexane as a second solvent for 2 minutes.

The white layer 8 on the opposite side of the plate was formed by masking the polycarbonate plate with gelatin while leaving the side to be treated, and immersing the thus treated plate successively in a mixed solvent of equal volumes of xylene and carbon tetrachloride as a first solvent and n-hexane as a second solvent for 30 seconds and 2 minutes, respectively.

The reflectance and transmission optical density of the thus formed pattern of micro-joints 6 on the light-quantity-controlling member 7 were 96% and 1.83, respectively. The white layer on the front side had a reflectance of 42% and a transmission optical density of 0.33. Thus, both the layers of micro-joints had very high light diffusing property.

The thin light box using the light-quantity-controlling member 7 thus produced was free from parallax, permitted easy construction and showed no color shading at all, as did the light box in Example 6. The unification of a lighting curtain and a light-diffusing member in one body facilitated the construction of the light box than before. Moreover, the brightness of the light box could be improved by 20% as compared with that produced by using a lighting curtain having a conventional pattern composed of an aluminum deposit and an acrylic resin diffuser panel. Furthermore, the weight of the light box could be fairly reduced by making the light-quantity-controlling member 7 as a thin plastic plate. Thus, a light box thinner than before was produced. It was most suitable as a backlight, for example, for a liquid crystal television.

As shown in the present example, a polycarbonate plate can also be used as a transparent plastic plate used for preparing the light-quantity-controlling member as well as the acrylic plate. Various plastic plates can be used in the same manner as above. The present invention is not limited to the above two kinds of plastic plates.

In the present example, the light-diffusing surface composed of micro-joins is not limited to a white surface having a high reflectance. A light-diffusing surface having a low reflectance, such as a light-translucent and diffusing surface, can also be formed instead of the white surface after forming the diffusing surface 8. That is, proper selection of the first solvent or the second solvent enables imparting an optional reflectance to the light-diffusing surface within the range of from high reflectances to low reflectances. Imparting the optional reflectance is possible in the case where a light-diffusing surface is formed on the whole surface as well as in the case where a light-diffusing surface is formed so as to make a pattern. In both cases, the layer of micro-joints exhibits excellent diffusing property.

EXAMPLE 9

This example presents an example of the production of an edge light type light guide panel by the process of the present invention.

Figure 8:
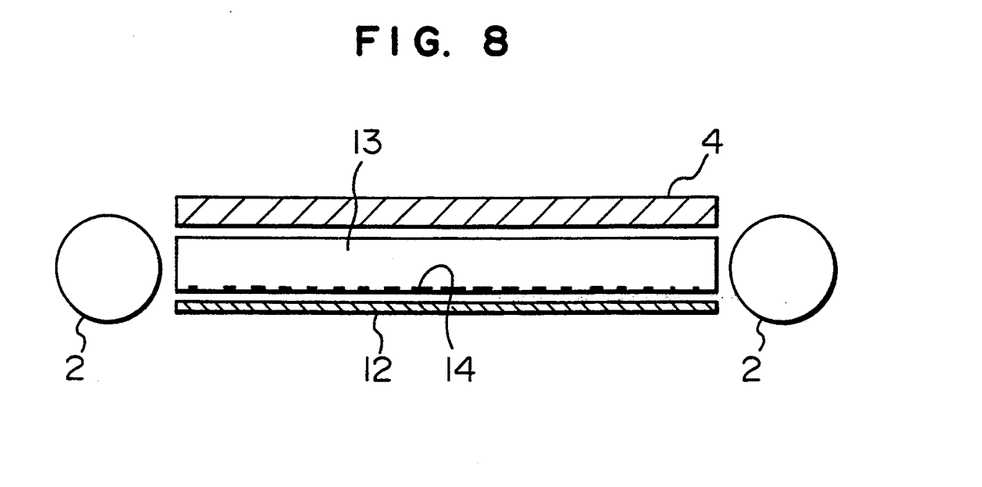
Figure 9:
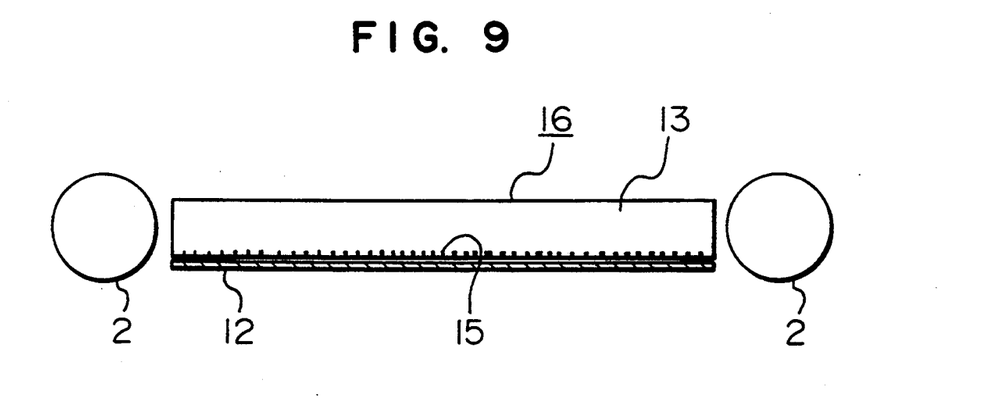

FIG. 8 shows the structure of a conventional thin light box of edge light type. FIG. 9 shows the structure of a thin light box of the present example. The conventional thin light box comprises a reflective sheet 12, light sources 2 and 2, a light guide panel 13 and a diffuser sheet 4. The thin light box of the present example has no component corresponding to the diffuser sheet 4. Therefore, in the conventional thin light box, the front surface of the diffuser sheet 4 functions as an illumination surface. In contrast, in the thin light box of the present example, the front surface of the light guide panel 13 functions as an illumination surface. In the conventional, edge light type, thin light box, the main purpose of the provision of the diffuser sheet 4 shown in FIG. 8 is to make invisible the reflective pattern formed on the bottom surface of the light guide panel 13 which controls the quantity of light. Therefore, when this pattern of dots is so minute that it cannot be perceived by eye, the diffuser sheet 4 becomes unnecessary. As a result, the efficiency of utilization of light is greatly improved and the construction of the light box becomes easy by the reduction of the number of parts.

The pattern of dots formed on the bottom surface of the light guide panel for controlling the quantity of light may be a pattern of dots of 200 mesh as in Example 2. However, by a conventional method comprising screen printing using ink containing a white pigment, such a minute pattern of dots cannot be formed. In addition, the efficiency of utilization of light is low for the reflectance of a pattern of dots formed by screen printing is about 80%.

A process for producing the light-quantity-controlling member also serving as a light guide panel in the present example is explained below.

A photoresist layer having a pattern of dots of 200 mesh designed to provide a uniform illuminance to an illumination surface was formed on one side of a transparent acrylic plate 13 (thickness: 2 mm) in the same manner as in Example 6. The pattern was exposed to light and developed. Then, an aqueous gelatin solution was applied on the other side and dried. The plate 13 thus treated was immersed in chloroform as a first solvent for 30 seconds and then in n-hexane as a second solvent for 2 minutes to form a pattern of micro-joints 15. Finally, the plate 13 was immersed in boiling water at 90° C. to peel off the gelatin layer on the opposite side of the side having a light-exposed photoresist portion.

Application of the light-quantity-controlling member 16 thus produced to the thin light box of FIG. 9 improved the brightness of the illumination surface of the light box by 25% as compared with the thin light box of FIG. 8 produced by the conventional method. This is due to the high reflectance of the pattern of dots (95%) as compared with the conventional ones (about 80%), improved light-diffusing property of the pattern, and the omission of the diffuser sheet 4. In the present example, the problem of parallax can be further reduced by dividing the diffuse reflective function of the pattern of micro-joints 15 into two parts and imparting one part of the function to the top surface of the light guide member 13 by the pattern 15 and another part to the bottom surface of the light guide member 13 by the pattern 15'.

EXAMPLE 10

Figure 11:
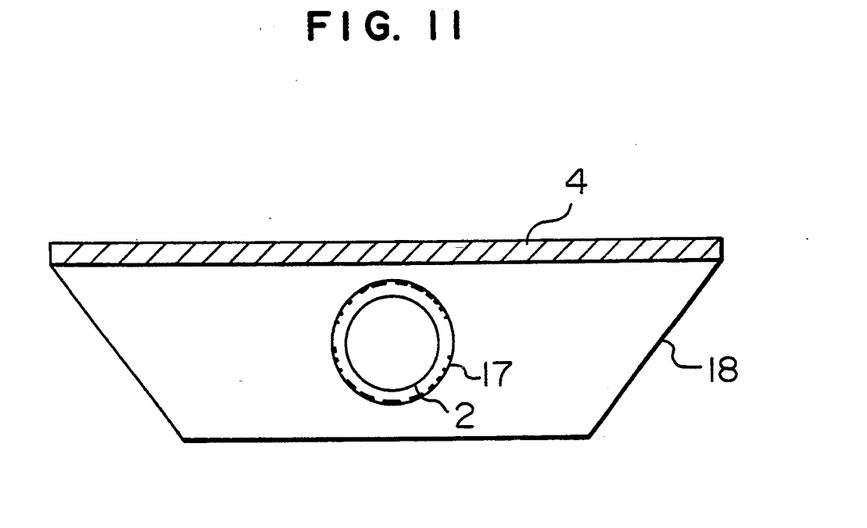

This example presents a method for obtaining a still brighter thin light box which comprises covering a fluorescent lamp 2 with a tubular light-quantity-controlling member 17 as shown in FIG. 11. This method is for uniformly illuminating the illumination surface on a diffusing member 4 and comprises forming a pattern of dots for controlling the quantity of light on the outside surface of a pipe made of a polymethyl methacrylate (hereinafter referred to as acrylic pipe), inserting a fluorescent lamp through the pipe and fixing the lamp in the pipe.

Although the use of the light-quantity-controlling member 17 necessitates highly precise adjustment of the angle of placement of the light-quantity-controlling member 17, it does not require so much precise adjustment of the other factors. Additionally, easy holding of the pipe-shaped, light-quantity-controlling member 17 in a light box as compared with a plate-shaped one leads to easy construction of a light box and reduction of the weight of a light box. Moreover, placement of the light-quantity-controlling member 17 in the vicinity of a light source improves the efficiency of utilization of light.

When a metallized film is adopted to the light-quantity-controlling member 17 in accordance with a conventional method, a very high precision is required of its pattern of dots, because the metallized film has no light-diffusing property. However, since the light-quantity-controlling member is placed near the light source, luminance non-uniformity is induced on the illumination surface by the errors caused by the thermal expansion of the substrate with the increase of the temperature.

Another conventional method, in which a light-diffusing property is achieved, is a method comprising printing a pattern of dots with an ink containing a white pigment. However, highly precise printing of the pattern on a curved surface is extremely difficult by the method. Moreover, the method involves the following various problems caused by the placement of the light-quantity-controlling member near the light source. For example, the light transmittance of the pattern of dots for controlling the quantity of light is too high; the pattern of dots is discolored with lapse of time due to its insufficient light resistance; and the pattern of dots is peeled off by the difference between the thermal expansion coefficients of a substrate and the pattern of dots. As discussed above, it was impossible to produce by the conventional methods such a light-quantity-controlling member that overcomes the disadvantages.

In contrast, the pattern of micro-joints according to the present invention can be formed on a curved surface; it does not need to be formed with an extremely high precision since it is a diffusing pattern; it has a transmittance sufficiently low to control the quantity of light; it is not peeled away from the substrate by the difference between the expansion coefficients of the substrate and the pattern and it has a light resistance equal to that of the resin of the substrate because both the substrate and the pattern are made of the same material.

A process for producing the light-quantity-controlling member 17 of the present example is explained below.

The same water-soluble photoresist as used in Example 1 was applied on the surface of an acrylic pipe. The pipe had an inside diameter a little larger than the external shape of a light source fluorescent lamp. The photoresist-applied acrylic pipe was then dried. Thereafter, around the dried acrylic pipe was wound a silver salt film on which the pattern of dots designed to render uniform the luminance of an illumination surface that had been printed. The film-wound pipe was exposed to light from a 1-kW mercury lamp (distance: 1 mm) for 5 minutes while rotating the pipe. The light-exposed pipe was immersed in warm water at 40° C. to wash away the portion of the photoresist which had not been exposed to light.

Then, both ends of the acrylic pipe were plugged with solvent-resistance plugs such as Teflon TM plugs. Thereafter, the plugged pipe was immersed in chloroform as a first solvent for 30 seconds and then in n-hexane as a second solvent for 2 minutes to form a pattern of micro-joints.

Finally, the pattern-formed pipe was immersed in boiling water at 90° C. to peel off the portion of the photoresist which had been exposed to light and the plugs at both ends were removed.

Figure 10:
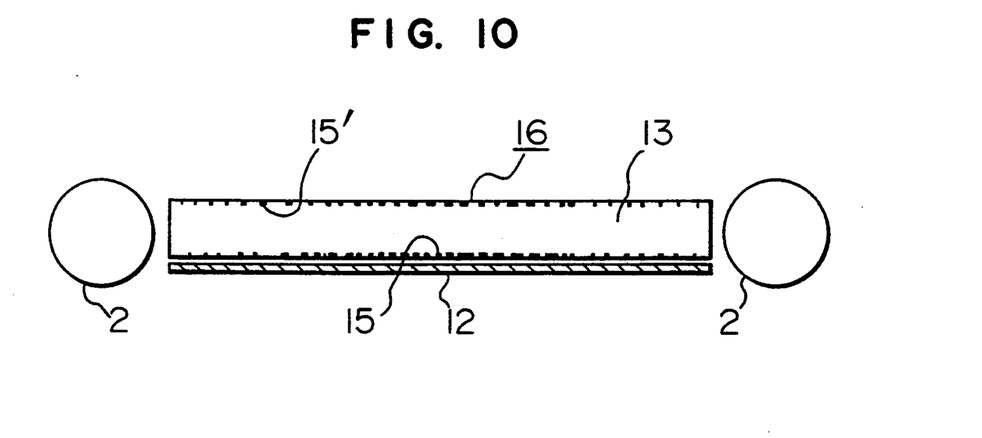

Applying the light-quantity-controlling member thus produced to a light box as shown in FIG. 10 could give a thin light box whose illumination surface was brighter than that of the light box obtained in example 6 by 10% and exhibited more uniform luminance than that of the light box obtained in example 6. The light-quantity-controlling member enabled easy adjustment of the relation between the positions of the member and a light source and permitted relatively rough adjustment of the other factors, so that the construction of the thin light box was very simple.

As shown in the present example, the pattern of micro-joints can be formed not only on a flat surface but also on a curved surface, so that it is possible to produce light-quantity-controlling members of various shape as well as of plate shape.

INDUSTRIAL APPLICABILITY

As explained above, according to the present invention, the various problems encountered in the formation of a very thin light diffuse reflective layer on the surface of a plastic material by a conventional technique have been solved. It is now possible to obtain a plastic optical member comprising a plastic material having on the surface a light diffuse reflection layer with such advantages that the layer had an adjustable light diffuse reflection property, it is formable in parts or so as to make a pattern, it is formable on any curved surfaces and it exhibits a flat spectral absorption distribution.

As a result, the application of the present invention to the light diffuse reflective surface, a section through which light is desired to be diffuse reflected or diffuse transmitted, of an optical member (e.g. optical members used in planar light sources, projection screens, window materials for building, various displays, office automatic appliances, and precision optical instruments) overcomes the various restrictions and widens the applicability of the optical member to various parts than before. Therefore, it is now possible to incorporate the optical member having a highly precisely controlled, light diffuse reflective surface into a precision optical systems. Moreover, according to the present invention, there can be provided such a light-quantity-controlling member that solves various problems contained in the conventional light-quantity-controlling means and that makes it possible to obtain a light box having a light weight, a bright illumination surface, easily constructible property, anti-parallax property, anti-color shading property and simplicity in structure.

We claim:

1. A plastic optical member comprising a plastic material having a light-diffusing layer comprising micro-joints on at least a part of a surface of said plastic material said micro-joints having a structure comprising very small cracks and spaces integrated closely at high density at the surface of the plastic material, said cracks and spaces having an average spacing of 0.01 to 50 μm and the light-diffusing layer of micro-joints having an average thickness of 1 to 30 μm, and providing a very high light diffuse reflectance.

2. A screen for projection which comprises a plastic optical member according to claim 1.

3. A display which comprises a plastic optical member according to claim 1.

4. A plastic optical member according to claim 1, wherein said cracks and spaces of said micro-joints are constituted as irregular shrinkage centers formed in the surface of said plastic material.

5. A plastic light-quantity-controlling member having a pattern of dots, said dots each comprising a multiplicity of micro-joints on a surface of the plastic member, said pattern of dots being arranged to adjust the quantity of diffused, transmitted and reflected light by said member, said micro-joints constituting a layer of multiple voids having an average distance between said multiple voids of 0.01 to 50 μm and an average thickness of said layer of 1 to 30 μm for providing a high whiteness and a very high diffusion of reflected light by repeated reflection and refraction of the light at said voids.

6. A light-source-directly-under-an-illumination surface type light box which comprises:

a flat housing having an open side and an inner surface which has reflecting properties, a light source in said flat housing, and a plastic light-quantity-controlling member according to claim 5 provided directly above the light source.

7. An edge light type light box which comprises:

a light-quantity-controlling member according to claim 5 also having a function of guiding light, said member comprising a plate with a flat front surface, a light diffuse-reflecting rear surface having said pattern of dots comprising micro-joints and a set of flat facing ends,
a linear light source facing at least one of the ends of the plastic light-quantity-controlling member, and
a light reflecting member placed at the diffuse-reflecting surface side of the light-quantity-controlling member.

8. A plastic light-quantity-controlling member according to claim 5, in which said micro-joints are in the form of irregular shrinkage cracks provided in said surface of said plastic member.

* * * * *